UNITED STATES PATENT OFFICE.

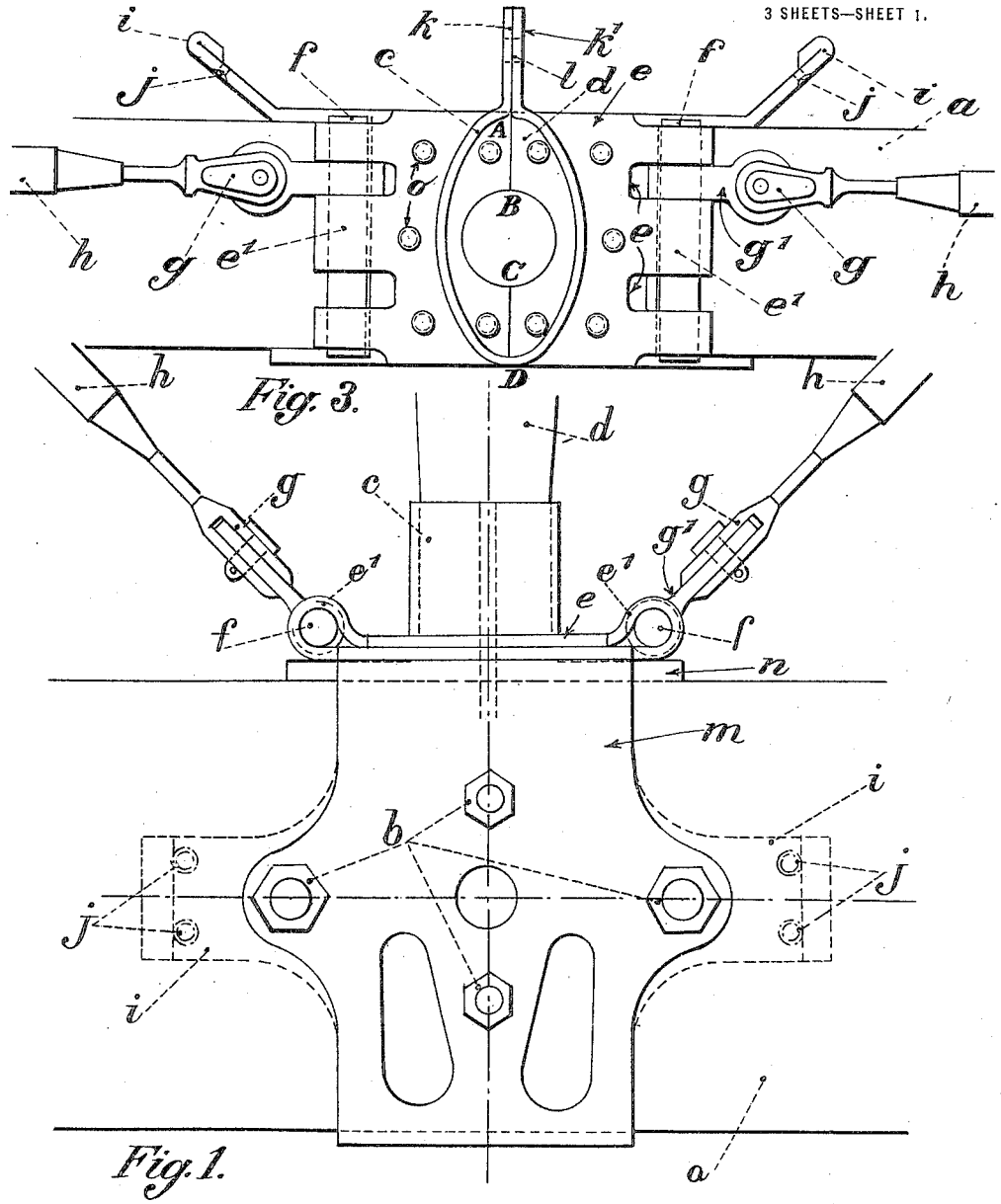

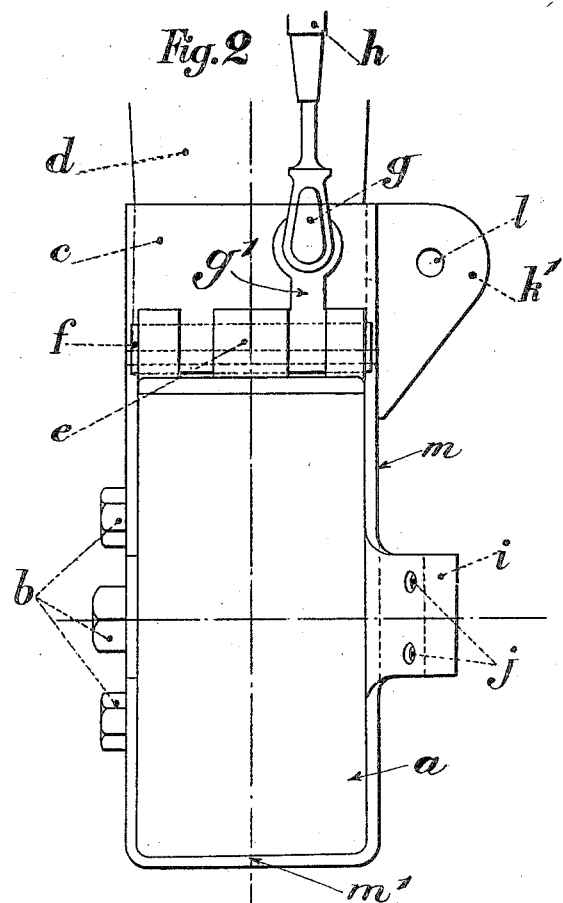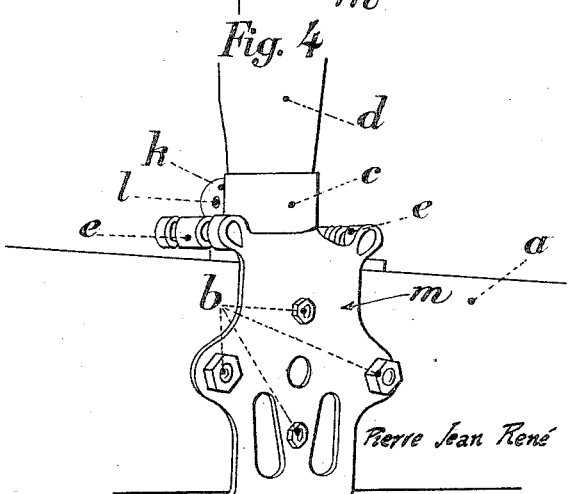

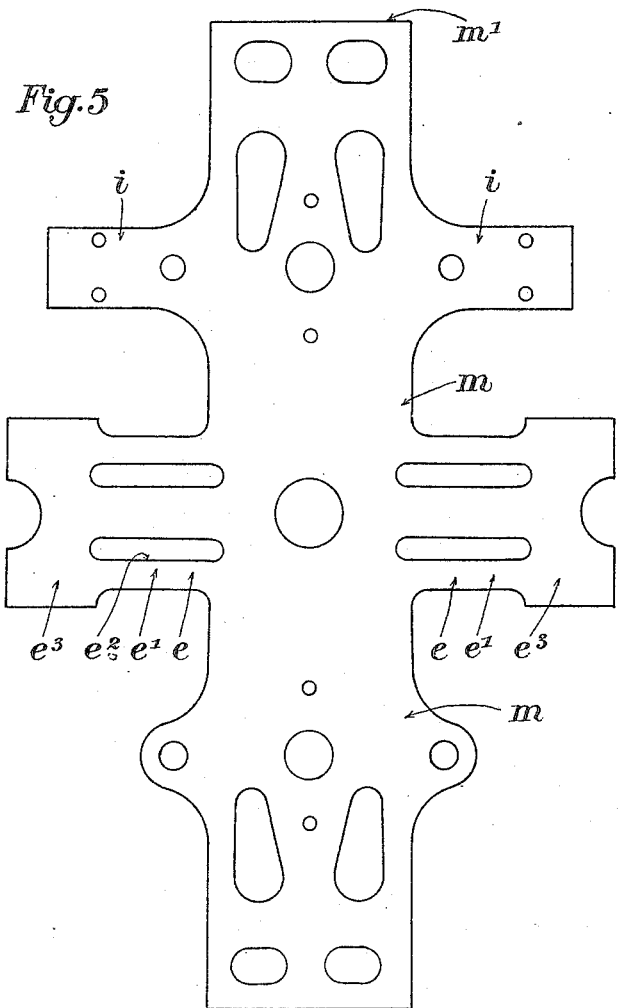
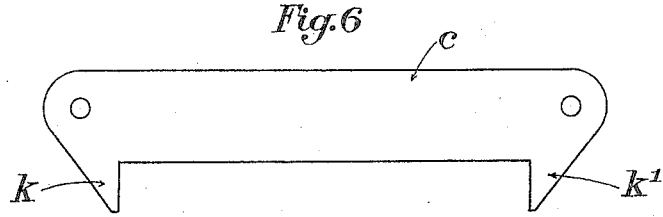

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, SEINE, FRANCE.

METAL FITTING FOR ASSEMBLING LONGITUDINALS AND UPRIGHTS IN AEROPLANES.

1,390,216. Specification of Letters Patent. Patented Sept. 6, 1921.

Application filed December 19, 1918. Serial No. 267,546.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Metal Fittings for Assembling Longitudinals and Uprights in Aeroplanes, (for which I have filed an application in France, Dec. 12, 1917, under Serial No. 96,879,) of which the following is a specification.

This invention has for its object to provide an improved metal fitting for effecting the assemblage of the cell uprights with the wing longitudinals in aeroplanes.

The improved metal fitting comprises a sleeve like metal plate body which surrounds the longitudinal and is bolted thereto, said sleeve member being provided with a welded on socket adapted to receive the end of an upright and lugs integral with said sleeve and pierced with eyes to which stay wires are attached. It is also provided with lugs integral with said sleeve and adapted to form hinges for the axle pins of tensioning members used in connection with other stay wires.

The accompanying drawings illustrate by way of example a constructional form of this invention.

Figures 1, 2, 3 and 4 are respectively a front elevation, a side elevation, a plan, and a perspective view of the whole assemblage. The cell upright is omitted in Fig. 3.

Fig. 5 shows the metal plate forming the sleeve and the lugs before bending.

Fig. 6 shows the plate forming the socket member before bending.

As shown in the drawings, the metal fitting comprises a sleeve like body $m$ formed of a sheet metal plate which is bent over and has its ends welded to each other at $m^1$ (Fig. 2) so as to form a rectangular bushing adapted to surround the wing longitudinal $a$ over its four faces. A spacing plate $n$ may be inserted between one face of the longitudinal and the corresponding wall of the fitting. The fitting is secured to the longitudinal by four bolts $b$ extending through both members. The upper wall of the fitting is provided with lateral lugs $e$ which are bent over upon themselves and abut along the lines AB and CD (Fig. 3), and may be welded to each other along said lines. The extreme edge of each lug is provided with a semi circular notch as shown at BC for reducing the weight. The bent over lugs are secured to the upper wall of the fitting for instance by rivets such as $o$.

A socket $c$ for receiving the cell upright $d$ is welded at its lower end to the upper face of the lugs $e$.

The lugs $e$ comprise a tubular portion $e^1$ slotted at $e^2$ so as to form hinges for the reception of the pins $f$ upon which eye members $g^1$ are pivoted, said eye members being connected to the forks $g$ in the case where the the stay wires are attached by means of tensioning members $h$.

Lugs $i$ designed for the direct attachment of the stay wires, are made integral with the sleeve $m$ and provided with an eye $j$ pierced near the turned-over edge of the metal plate.

The upright socket $c$ is formed of a plate bent to an oval form and provided with projecting portions $k$ $k^1$ which are brought flatwise together and welded along their edges. The lug so formed is pierced.

It will be perceived that the lug $k$ is pierced with the hole $l$ for the direct attachment of a stay wire.

Having now described my invention, what I claim as new and desire to secure by Letters Patent is:

1. A metal fitting for assembling cell uprights with wing beams in aeroplanes comprising a sleeve member formed of a metal plate bent over and welded at the meeting edges and adapted to entirely surround the longitudinal and be bolted thereon, lugs integral with said sleeve folded over themselves and adapted to receive the stay wires and to form hinges for receiving the axle pins of tensioning members, and a socket member adapted to receive the end of an upright and secure at one end to said lugs.

2. A metal fitting for assembling cell uprights with beams in aeroplanes comprising a sleeve member formed of a metal plate bent over and welded at the meeting edges and adapted to entirely surround the longitudinal and be bolted thereon, lugs integral with said sleeve folded over themselves and adapted to receive the stay wires and to form hinges for receiving the axle pins of tensioning members, and a socket member adapted to receive the end of an upright and secure at one end to said lugs, the said socket member being formed of a bent over plate and provided with projecting portions which are brought flatwise together, welded together and pierced with an eye for receiving a stay wire.

In testimony whereof I have signed my name to this specification.

PIERRE JEAN RENÉ POSTEL-VINAY.